United States Patent [19]
Depelsenaire

[11] Patent Number: 5,935,539
[45] Date of Patent: Aug. 10, 1999

[54] REACTIVE COMPOSITION AND METHOD FOR THE PURIFICATION OF A NITRIC OXIDE CONTAINING GAS

[75] Inventor: Guy Depelsenaire, Court-Saint-Etienne, Belgium

[73] Assignee: SOLVAY (Société Anonyme), Brussels, Belgium

[21] Appl. No.: 08/809,271

[22] PCT Filed: Aug. 31, 1995

[86] PCT No.: PCT/EP95/03430

§ 371 Date: Oct. 8, 1997

§ 102(e) Date: Oct. 8, 1997

[87] PCT Pub. No.: WO96/07468

PCT Pub. Date: Mar. 14, 1996

[30] Foreign Application Priority Data

Sep. 9, 1994 [FR] France .................................. 94 10944

[51] Int. Cl.⁶ ........................... B01D 53/50; B01D 53/56; B01D 53/60; B01D 53/68

[52] U.S. Cl. .................... 423/239.1; 423/240 S; 423/244.07; 423/244.08

[58] Field of Search ............... 252/182.32, 184; 423/240 S, 244.08, 244.07, 239.1

[56] References Cited

U.S. PATENT DOCUMENTS

| | | | |
|---|---|---|---|
| 4,301,652 | 11/1981 | Sohda et al. ........................... | 60/310 |
| 4,783,325 | 11/1988 | Jones ..................................... | 423/235 |
| 4,908,195 | 3/1990 | Wanner et al. ........................ | 423/239 |
| 5,118,480 | 6/1992 | Cook et al. ............................ | 423/230 |
| 5,186,914 | 2/1993 | Yoshihiro et al. ..................... | 423/239 |
| 5,540,902 | 7/1996 | De Soete .............................. | 423/239.1 |

FOREIGN PATENT DOCUMENTS

| | | |
|---|---|---|
| 0301272 A2 | 2/1989 | European Pat. Off. . |
| 2681795 A1 | 4/1993 | France . |
| 39 08 052 A1 | 9/1990 | Germany . |
| 51006884 | 6/1974 | Japan . |
| 57-18974 | 1/1982 | Japan . |

*Primary Examiner*—Gary P. Straub
*Assistant Examiner*—Timothy C Vanoy
*Attorney, Agent, or Firm*—Venable; John W. Schneller

[57] ABSTRACT

A process for removing nitrogen oxides and/or sulfur oxides and/or hydrogen chloride out of a gas, for example from the combustion of fuel or the incineration of waste, by injecting a mixture of a peroxide compound such as sodium percarbonate and an alkali metal salt such as alkali metal carbonates, alkali metal bicarbonates and solid solutions of alkali metal carbonate and alkali metal bicarbonate into the gas and filtering the gas in bag filter, cyclone or electrostatic separator.

4 Claims, 12 Drawing Sheets

REACTIVE COMPOSITION AND METHOD FOR THE PURIFICATION OF A NITRIC OXIDE CONTAINING GAS

CROSS REFERENCE TO RELATED APPLICATION

This application is the National Stage filing under 35 U.S.C. §371 of International Application No. PCT/EP95/03430 filed Aug. 31, 1995, and incorporated herein by reference.

The invention relates to the purification of gases contaminated by nitric oxide, in particular to the purification of smoke generated by the combustion of a fuel in the presence of air.

TECHNOLOGY REVIEW

Smoke generated by the combustion of gaseous, liquid or solid combustible materials is usually contaminated by nitrogen oxides arising from atmospheric nitrogen and, if appropriate, from nitrogenous compounds present in the fuel. In this smoke, most of the nitrogen oxides are composed of nitric oxide (NO), the balance being mainly composed of nitrogen dioxide ($NO_2$).

The high toxicity of nitric oxide and nitrogen dioxide and their contribution to the formation of acid rain imply removing them from smoke before discharging the latter to the atmosphere.

U.S. Pat. No. 4,783,325 provides a two-stage process for purifying a gas containing nitric oxide. In a first step, a gas mixture containing oxygen and an initiator of perhydroxyl radicals is introduced into the gas to be purified, which is maintained at high temperature, so as to oxidize the nitric oxide to nitrogen dioxide; in a second step, the gas collected from the first step is treated with lime, sodium carbonate, sodium bicarbonate or sodium sesquicarbonate, in order to decompose the nitrogen dioxide. In this known process, the gas compound which is the initiator of perhydroxyl radicals can be a vaporized hydrocarbon or gaseous hydrogen peroxide. This known process implies that two different reactants are introduced separately and successively into the gas to be treated, which complicates its implementation and requires expensive equipment. The use of a gaseous reactant complicates the execution of the process still more.

In order to purify a gas from nitrogen dioxide, the suggestion has also been made to subject it to washing by means of an alkaline solution of hydrogen peroxide or of a peroxide compound such as sodium perborate or percarbonate (Japanese Patent Application JP-A-51006884). This process, however, does not relate to the purification of a gas contaminated by nitric oxide. Moreover, it has the disadvantage of requiring complex and expensive equipment for carrying out washing of the gas to be purified with the aqueous alkaline solution.

It has also been proposed to introduce sodium percarbonate or sodium perborate into a cigarette filter, in order to remove nicotine, carbon monoxide, nitric oxide and nitrogen dioxide from the smoke (Japanese Patent Application JP-A-57018974).

The invention is targeted at providing a solid reactive composition which makes possible efficient purification of a gas contaminated by nitric oxide, while avoiding the disadvantages of the known processes described above.

SUMMARY OF THE INVENTION

The invention consequently relates to a pulverulent solid reactive composition for purifying, from nitric oxide, a gas containing nitric oxide, the said composition comprising a mixture composed of at least one solid peroxide compound and of at least one alkali metal salt selected from alkali metal carbonates, alkali metal bicarbonates, and alkali metal carbonate and alkali metal bicarbonate solid solutions.

Figure 1:
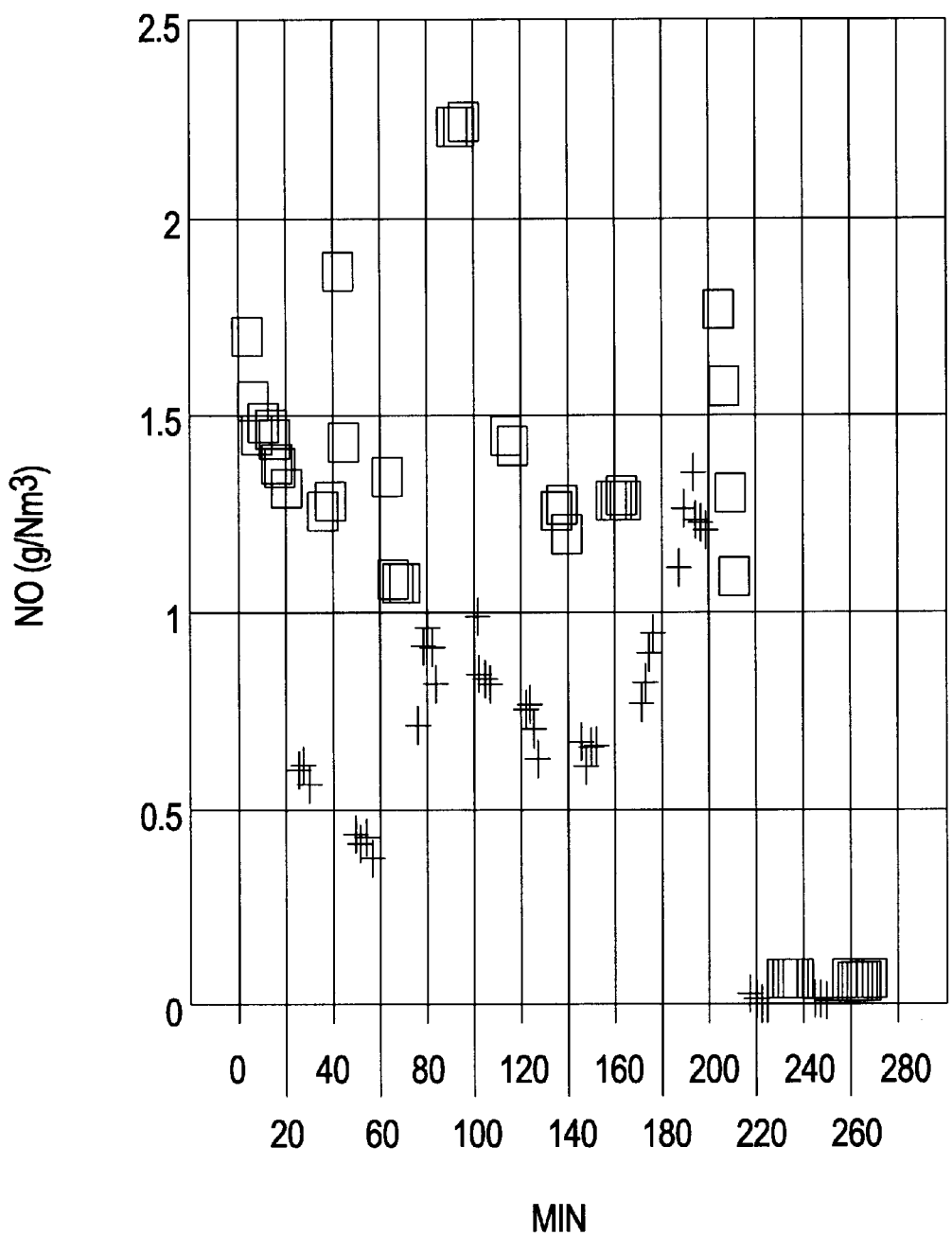
FIG. 1 shows the amount of NO removed out of smoke using sodium percarbonate powder.

In the composition according to the invention, solid peroxide compound is understood to mean a peroxide compound which is solid and stable at room temperature. As a general rule, the peroxide compound must be solid and stable at temperatures of at least 15° C. and preferably of at least 25° C. The function of the peroxide compound is to release active oxygen into the gas. The peroxide compound of the composition according to the invention must consequently have a decomposition temperature which is at most equal to and preferably less than the normal temperature of the purification treatment of the gas. In practice, the peroxide compound is selected from those whose normal decomposition temperature lies below 200° C. and preferably below 100° C., peroxide compounds whose decomposition temperature is less than or equal to 60° C. being especially advantageous.

The peroxide compound can be an inorganic compound or an organic compound. It can be, for example, selected from metal peroxides and persalts derived from inorganic or organic acids. It is advantageously selected from alkali metal compounds. Alkali metal percarbonates are preferred. Sodium percarbonate is especially recommended.

The composition according to the invention can comprise a single peroxide compound or a number of different peroxide compounds.

The alkali metal salt of the composition according to the invention is selected from alkali metal carbonates, alkali metal bicarbonates, and alkali metal carbonate and alkali metal bicarbonate solid solutions. The alkali metal salt is preferably selected from sodium salts, more precisely sodium carbonate, sodium bicarbonate, sodium sesquicarbonate and Wegscheider's salt. Sodium bicarbonate and sodium sesquicarbonate are especially advantageous. Sodium bicarbonate is preferred. In the case where the alkali metal salt of the composition according to the invention simultaneously comprises alkali metal carbonate and alkali metal bicarbonate, it is desirable for it to comprise more than 98% (preferably at least 99%) by weight of alkali metal bicarbonate and less than 2% (preferably at most 0.1%) by weight of alkali metal carbonate.

Compositions in accordance with the invention which are preferred are those in which the alkali metal peroxide compound comprises a sodium peroxide compound and the alkali metal salt is selected from sodium carbonate, sodium bicarbonate and sodium carbonate and sodium bicarbonate solid solutions.

In the composition according to the invention, the respective contents of peroxide compound and of alkali metal salt will depend on various parameters, in particular on the peroxide compound selected, on the alkali metal salt selected and on the composition of the gas to be purified, in particular on its relative content of nitric oxide and on the possible presence of other nitrogenous compounds, of sulphur oxides, of hydrogen chloride and of oxygen. These contents must consequently be determined in each specific case by routine laboratory work. The composition according to the invention can thus comprise the peroxide compound in an amount by weight from 5% (preferably from 20%) to 95% (preferably to 80%) of the weight of the mixture composed of the peroxide compound and of the alkali metal salt. According to an especially advantageous embodiment, the composition according to the invention contains the peroxide compound in an amount by weight from 10 to 50% (preferably from 10 to 25%) of the weight of the above-mentioned mixture.

The composition according to the invention can optionally contain additives, in addition to the mixture of the peroxide compound and of the alkali metal salt, for example stabilizers for the peroxide compound or an additive which facilitates fluidization of the composition for bringing it into contact with a gas to be purified.

The composition according to the invention is in the form of a powder. To this end, it is preferable for the peroxide compound and the alkali metal salt to have similar particle size distributions, although this is not an essential condition. The optimum particle size of the composition according to the invention will depend on its destination, in particular on the gas to be purified, on its flow rate and on the process used for treating the gas with the composition. In practice, the particle size distribution of the reactive composition has to be a compromise, as it is known that a fine particle size will promote the reaction with the nitrogen oxides of the gas to be purified whereas a coarse particle size will promote the subsequent separation of the solid reaction products. It must consequently be defined in each specific case, by means of routine laboratory tests. according to the destination of the composition. In practice, it proves advantageous to select a particle size characterized by a mean particle diameter of less than 50 $\mu$m (preferably at most equal to 30 $\mu$m) and a particle size gradient of less than 5 (preferably at most equal to 3), the mean diameter $D_m$ and the particle size gradient $\sigma$ being defined by the relationships $$D_m = \frac{\sum n_i \cdot D_i}{\sum n_i}, \sigma = \frac{D_{90} - D_{10}}{D_{50}}$$

in which $n_i$ denotes the frequency (by weights of the particles with diameter $D_i$ land $D_{90}$ ($D_{50}$ and $D_{10}$ respectively) represents the diameter at which 90% (50% and 10% respectively) of the particles of the reactive composition (expressed by weight) have a diameter of less than $D_{90}$ ($D_{50}$ and $D_{10}$ respectively). These particle size parameters are defined by the method of analysis by diffraction of laser beams using a Sympatec model Helos 12LA measuring device manufactured by Sympatec GmbH. Particle sizes which are especially recommended are those corresponding to a mean diameter of 10 to 30 $\mu$m and a particle size gradient of 1 to 3.

Although it is especially suited to the purification of gases from nitric oxide, the reactive composition according to the invention is also suitable for purifying gases contaminated by other nitrogen oxides, such as nitrous oxide ($N_2O$), nitrogen trioxide ($N_2O_3$), nitrogen pentoxide ($N_2O_5$) and nitrogen dioxide ($NO_2$). The combination of the nitrogen oxides of the gas will subsequently be denoted $NO_x$. Moreover, by an appropriate choice of the alkali metal salt and of the content of this salt, the composition according to the invention can also be suitable for purifying a gas contaminated by hydrogen chloride or sulphur oxides, in particular sulphur dioxide. The composition according to the invention thus has the advantageous property of making possible simultaneous purification of a gas from nitrogen oxides $NO_x$, from hydrogen chloride and from sulphur oxides. The composition according to the invention, for this reason, finds an advantageous application in the purification of smoke generated by the combustion of sulphur-containing fossil fuels (such as fuel oil or coal) and in the purification of effluent smoke from the incineration of waste, such as, for example, of household waste, of hospital waste and of plant waste.

According to a specific embodiment of the invention, the reactive composition comprises carbon in the form of particles. The reactive composition according to this embodiment of the invention is especially suited to the purification of a smoke contaminated by mercury, dioxins or furans. In this embodiment of the invention, the carbon is advantageously active charcoal and its particle size is in accordance with the conditions laid down above for the peroxide compound and the alkali metal salt. The content by weight of carbon in the reactive composition is generally at least 0.5% (preferably at least 1%) of the weight of the mixture composed of the peroxide compound and of the alkali metal salt; it is generally less than 20% (preferably less than 15%) of the weight of this mixture. Compositions which are especially recommended comprise from 1 to 10% by weight of carbon with respect to the weight of the said mixture.

The invention also relates to a process for the purification of a smoke from nitric oxide, according to which a reactive composition in accordance with the invention is introduced into the smoke and the smoke is then subjected to dust removal.

In the process according to the invention, the reactive composition is introduced in the solid form into the smoke. In general, the reactive composition is introduced into a stream of the smoke moving within a reaction chamber. The nitrogen oxides are destroyed in the latter by the reactive composition, with the formation of alkali metal nitrite and nitrate. In the case of a smoke contaminated by hydrogen chloride or sulphur oxides, these compounds are decomposed with the formation of alkali metal chloride or sulphate. In the case of a smoke contaminated by mercury, dioxins or furans, a reactive composition is advantageously selected which comprises carbon particles. In this way, the smoke is purified from mercury, from dioxins and from furans, these contaminants being adsorbed on the carbon particles.

Removal of dust from the smoke has the function of extracting therefrom the particles of alkali metal nitrite and nitrate and, if appropriate, the particles of alkali metal chloride or sulphate formed and the carbon particles impregnated with mercury, dioxins or furans. Dust removal can be carried out by any known appropriate means, for example by mechanical separation in a cyclone, by filtration through a filter cloth or by electrostatic separation. Filtration through a filter cloth (for example a bag filter) is the preferred method of dust removal.

In the process according to the invention, treatment of the smoke with the reactive composition must be carried out at a temperature which is suitable for making possible efficient reaction of the composition with the nitric oxide in the smoke. In practice, the temperature must be greater than 350 K and preferably at least equal to 375 K, temperatures greater than or equal to 400 K being especially advantageous. In principle, the maximum temperature limit allowable corresponds to the melting temperatures of the compounds of the reactive composition and of the compounds from the reaction with the constituents of the smoke. In practice, it is set by the mechanical strength of the industrial equipment, in particular of the dust collector. In the case where dust removal comprises filtration through a filter cloth, it is recommended that the temperature of the smoke does not exceed approximately 550 K on the filter cloth. In order to favour the purification yield, it is obviously possible to introduce the reactive composition into the smoke at a temperature which is markedly higher and then to cool it before subjecting it to dust removal.

Although not wishing to be bound by a theoretical explanation, the inventors believe that, in the process according to the invention, the peroxide compound is decomposed on contact with the hot smoke and releases atomic oxygen which interacts with the alkali metal salt in order to convert nitric oxide to alkali metal nitrite and nitrate. The reactive composition must consequently be used in an amount which is sufficient to convert a substantial fraction of the nitrogen oxides $NO_x$ to alkali metal nitrite and nitrate, the said fraction corresponding, for example, to a national or international standard laid down for the composition of industrial or domestic smoke discharged to the atmosphere. The optimum amount of reactive composition to be used must consequently be determined in each specific case, by routine tests or calculations, according to the purification standards laid down.

The advantage of the invention will emerge from the description of the following examples, with reference to the appended drawings, which consist of twelve diagrams providing the composition of contaminated smoke. before and after having undergone a purification treatment.

EXAMPLES

Figure 2:
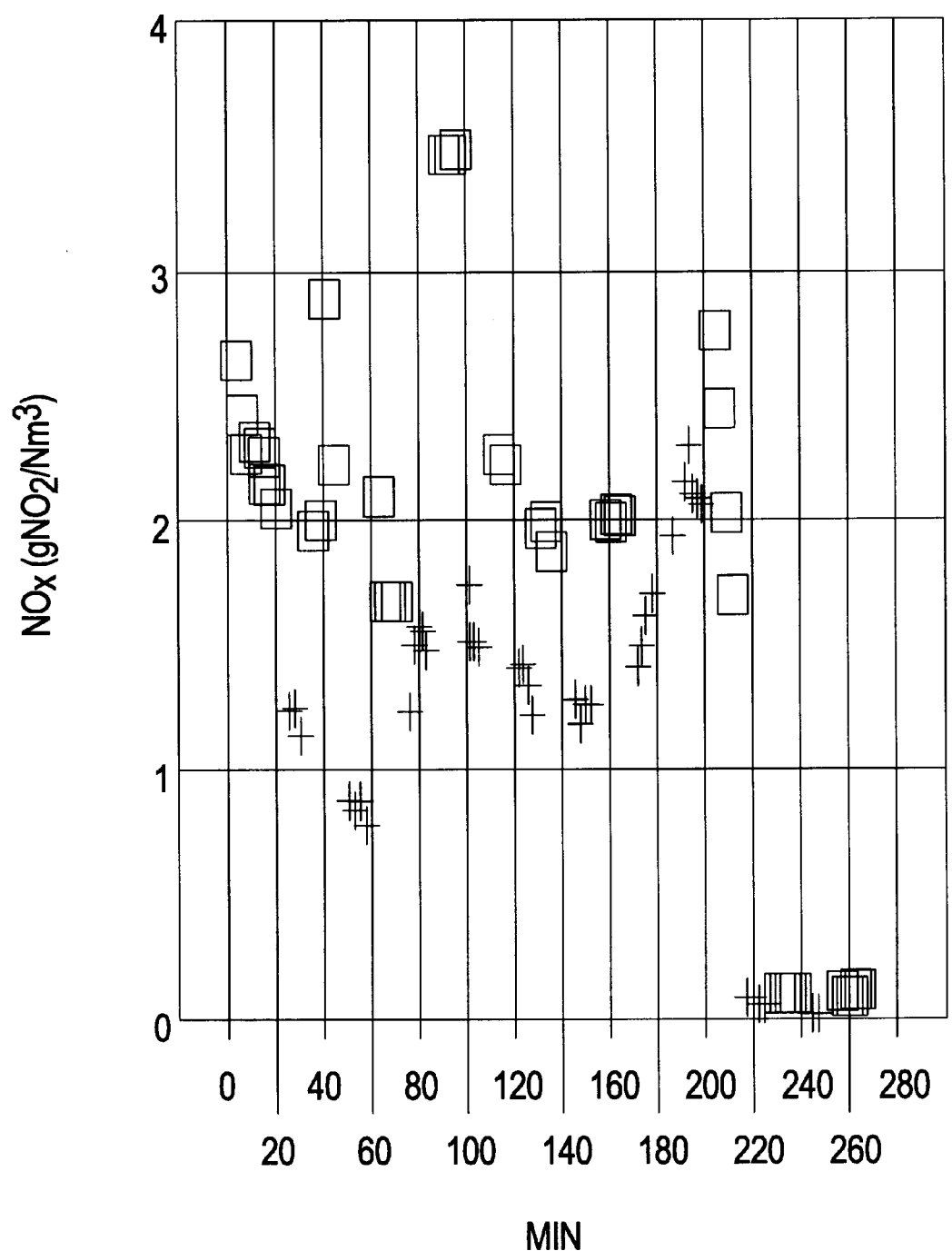
FIG. 2 shows the amount of $NO_x$ removed out of smoke using sodium percarbonate powder.
Figure 3:
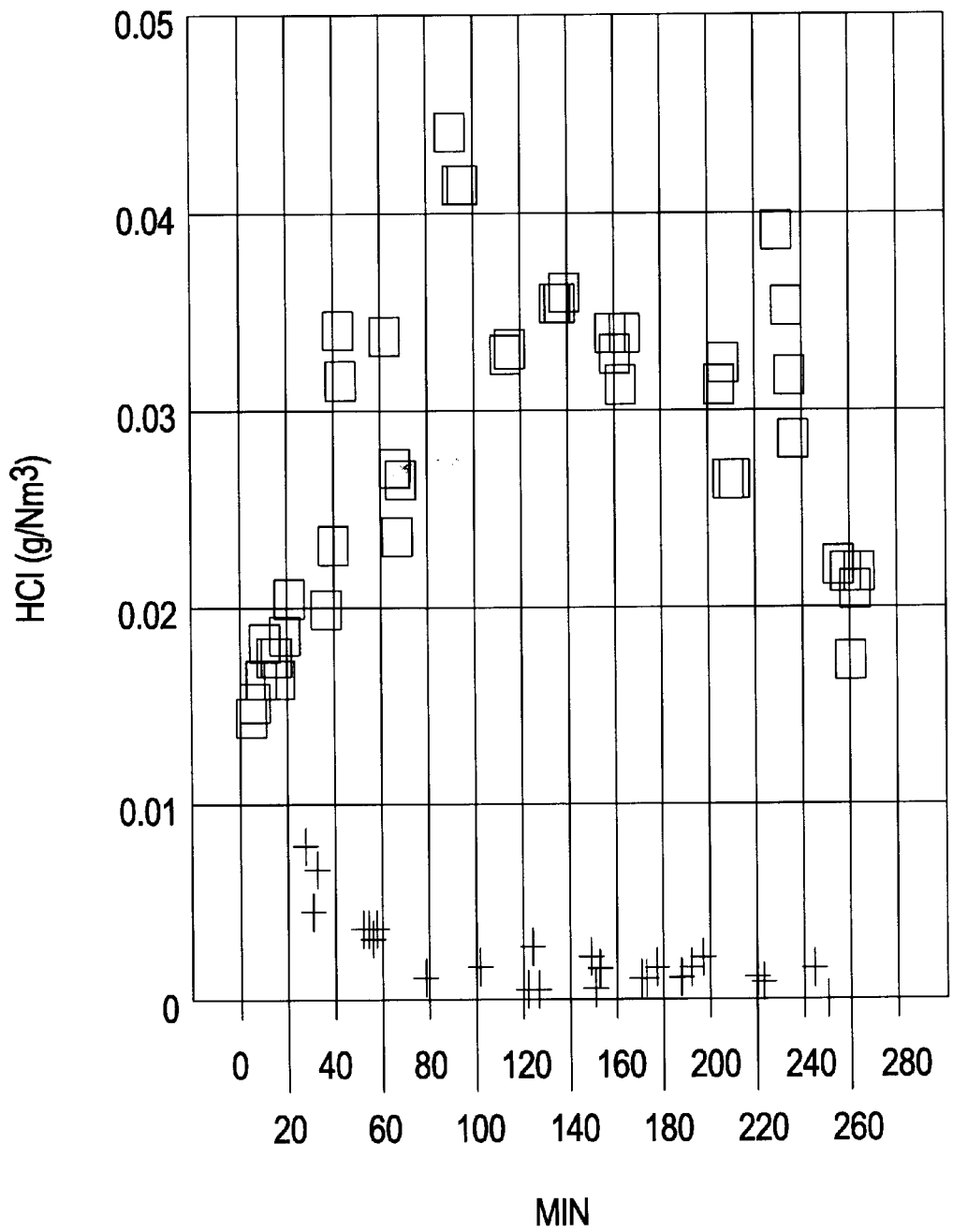
FIG. 3 shows the amount of HCl removed out of smoke using sodium percarbonate powder.
Figure 4:
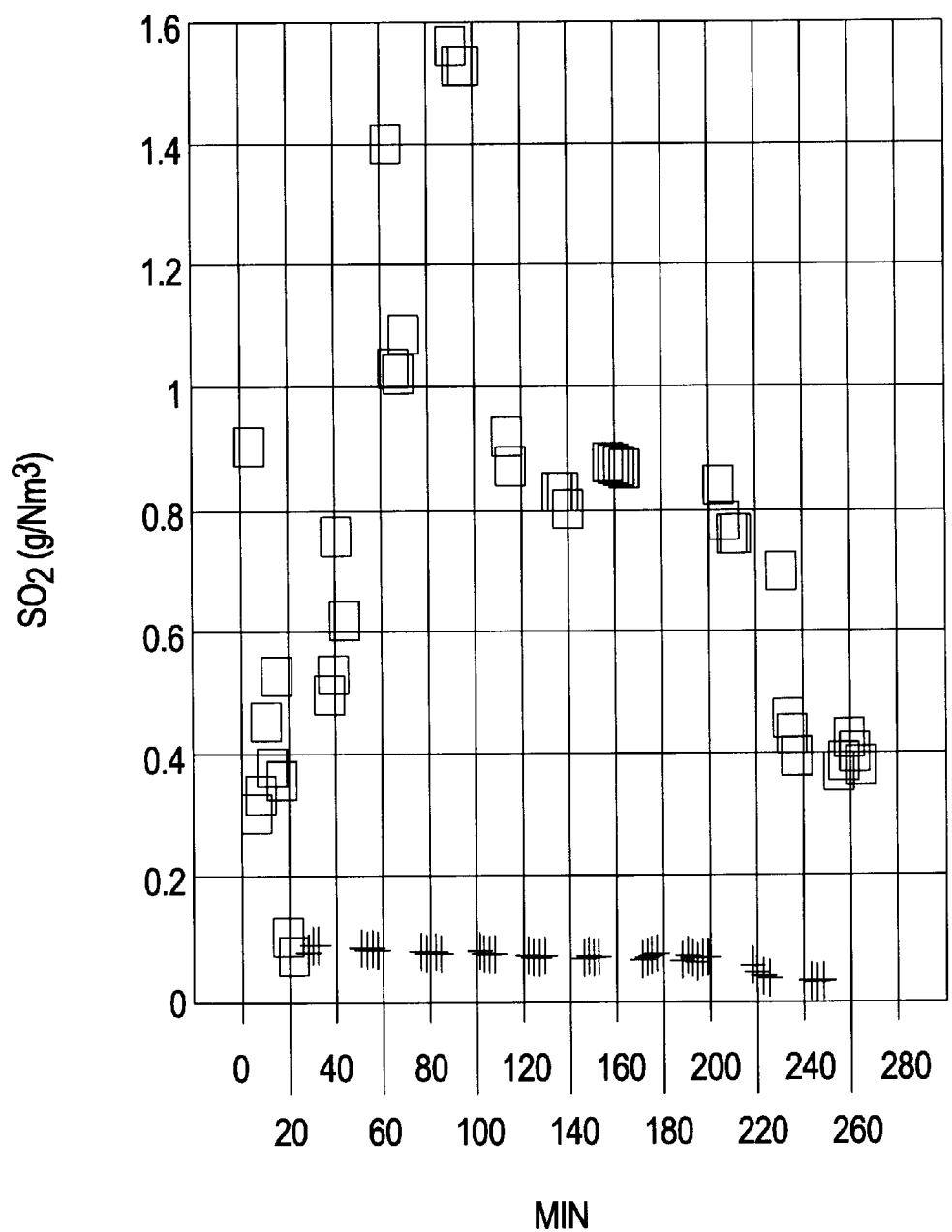
FIG. 4 shows the amount of $SO_2$ removed out of smoke using sodium percarbonate powder.
Figure 5:
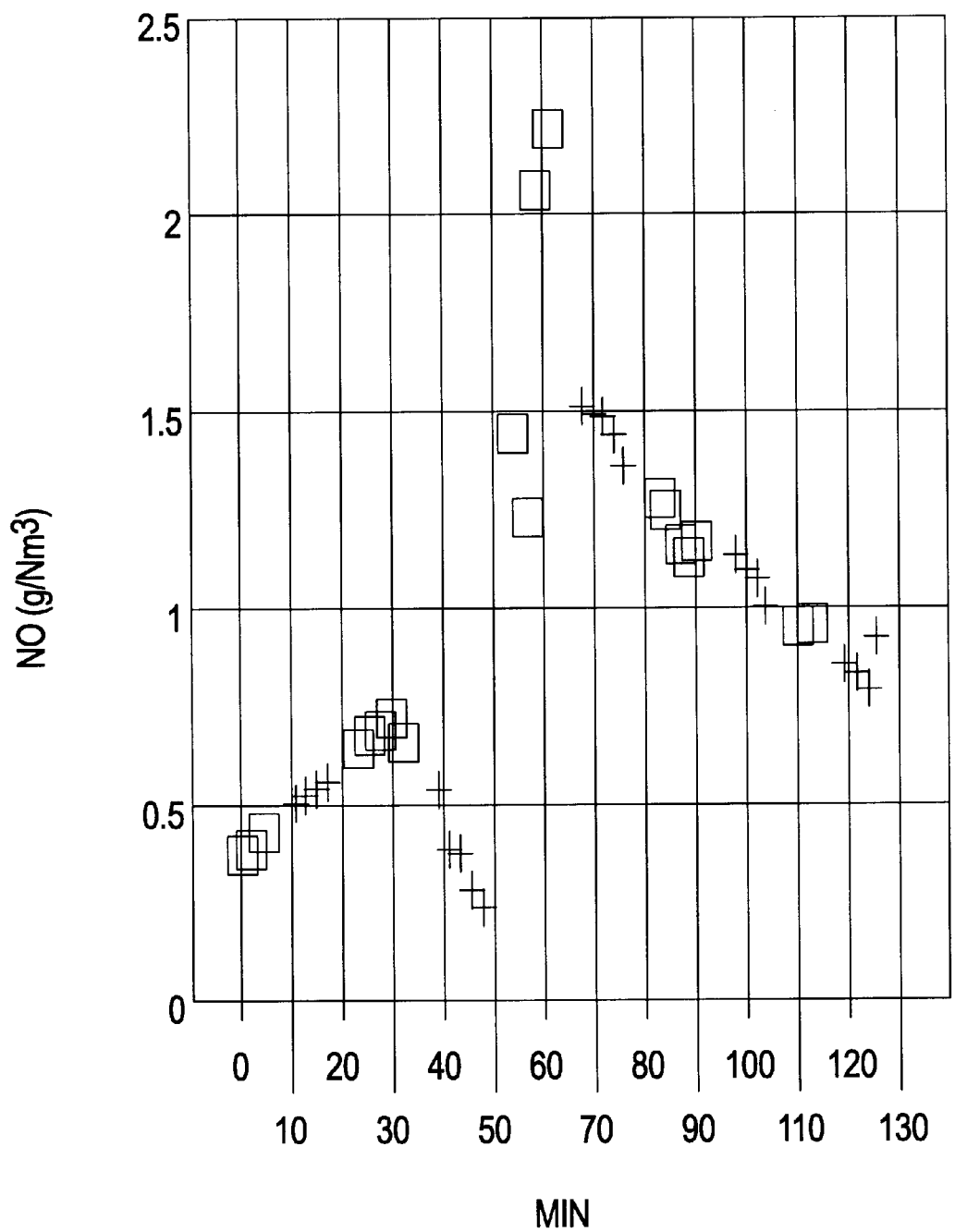
FIG. 5 shows the amount of NO removed out of smoke using sodium bicarbonate powder.
Figure 6:
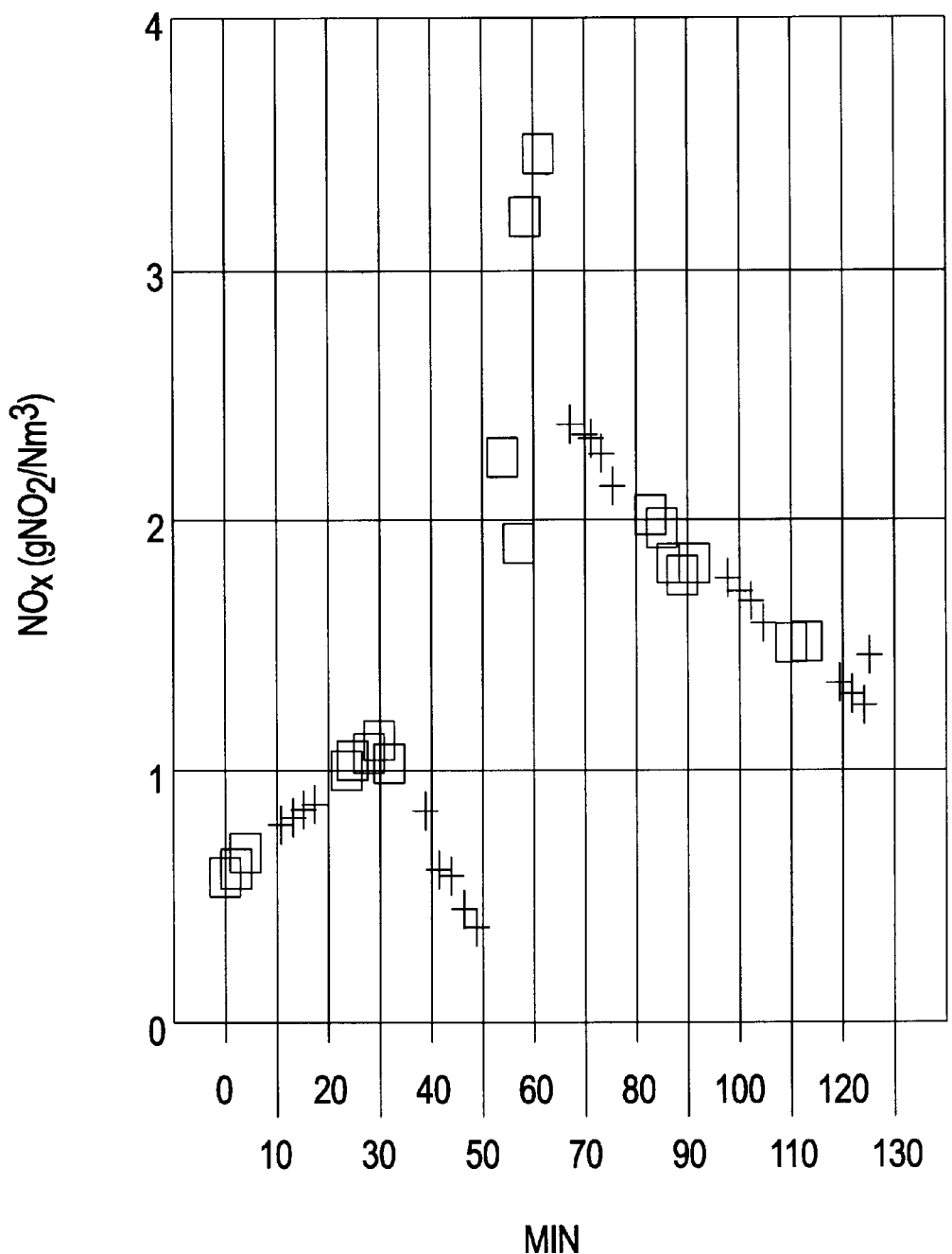
FIG. 6 shows the amount of $NO_x$ removed out of smoke using sodium bicarbonate powder.
Figure 7:
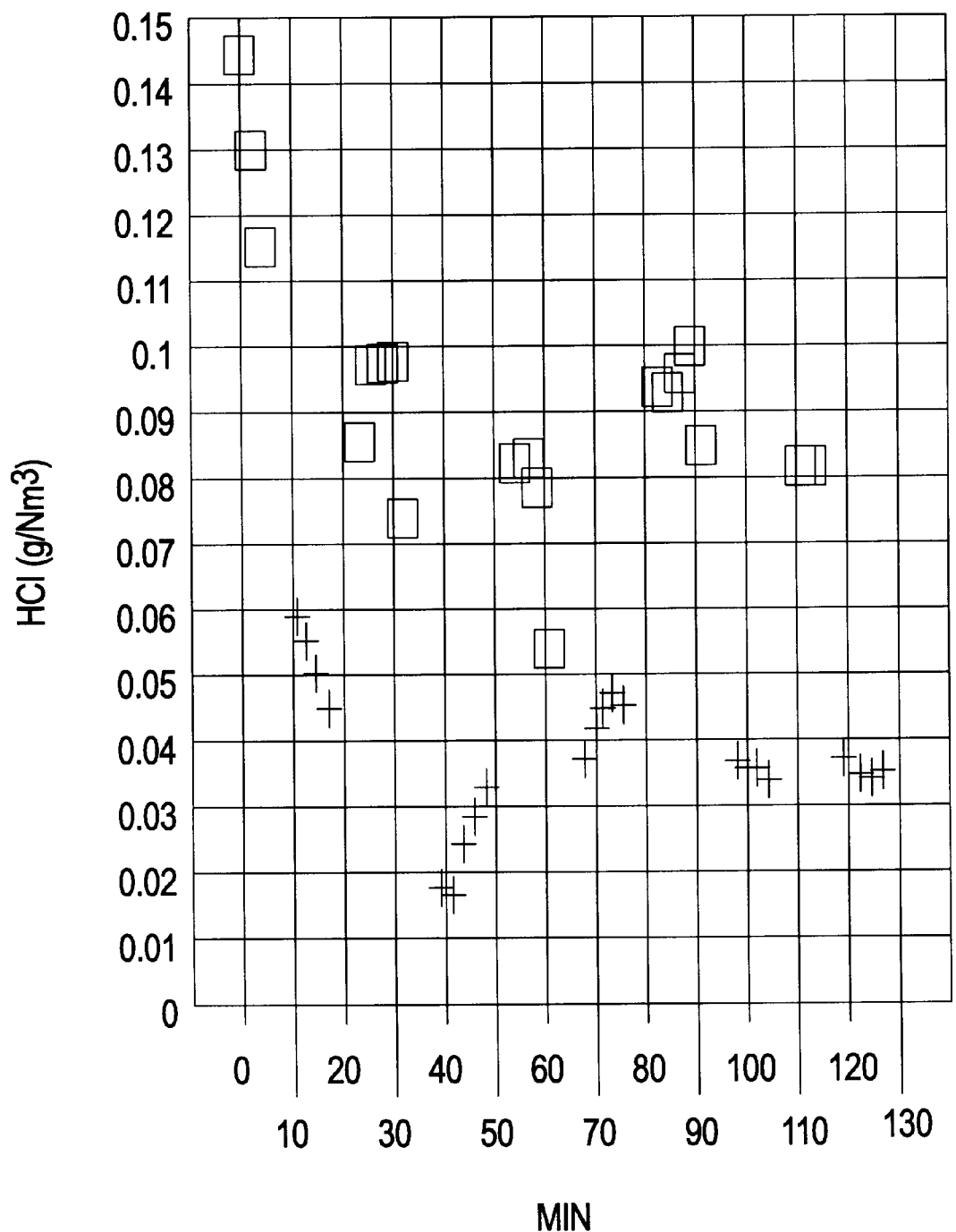
FIG. 7 shows the amount of HCl removed out of smoke using sodium bicarbonate powder.
Figure 8:
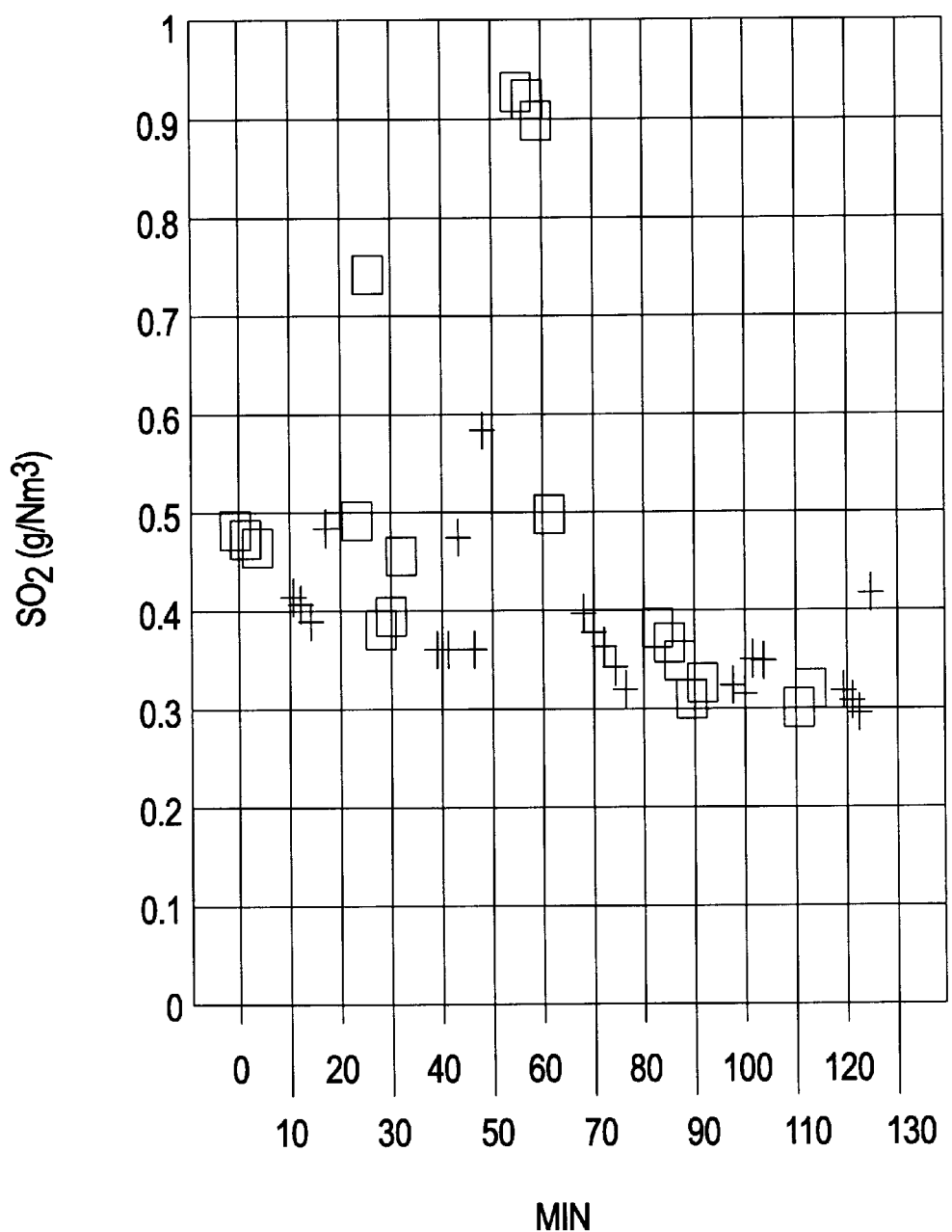
FIG. 8 shows the amount of $SO_2$ removed out of smoke using sodium bicarbonate powder.
Figure 9:
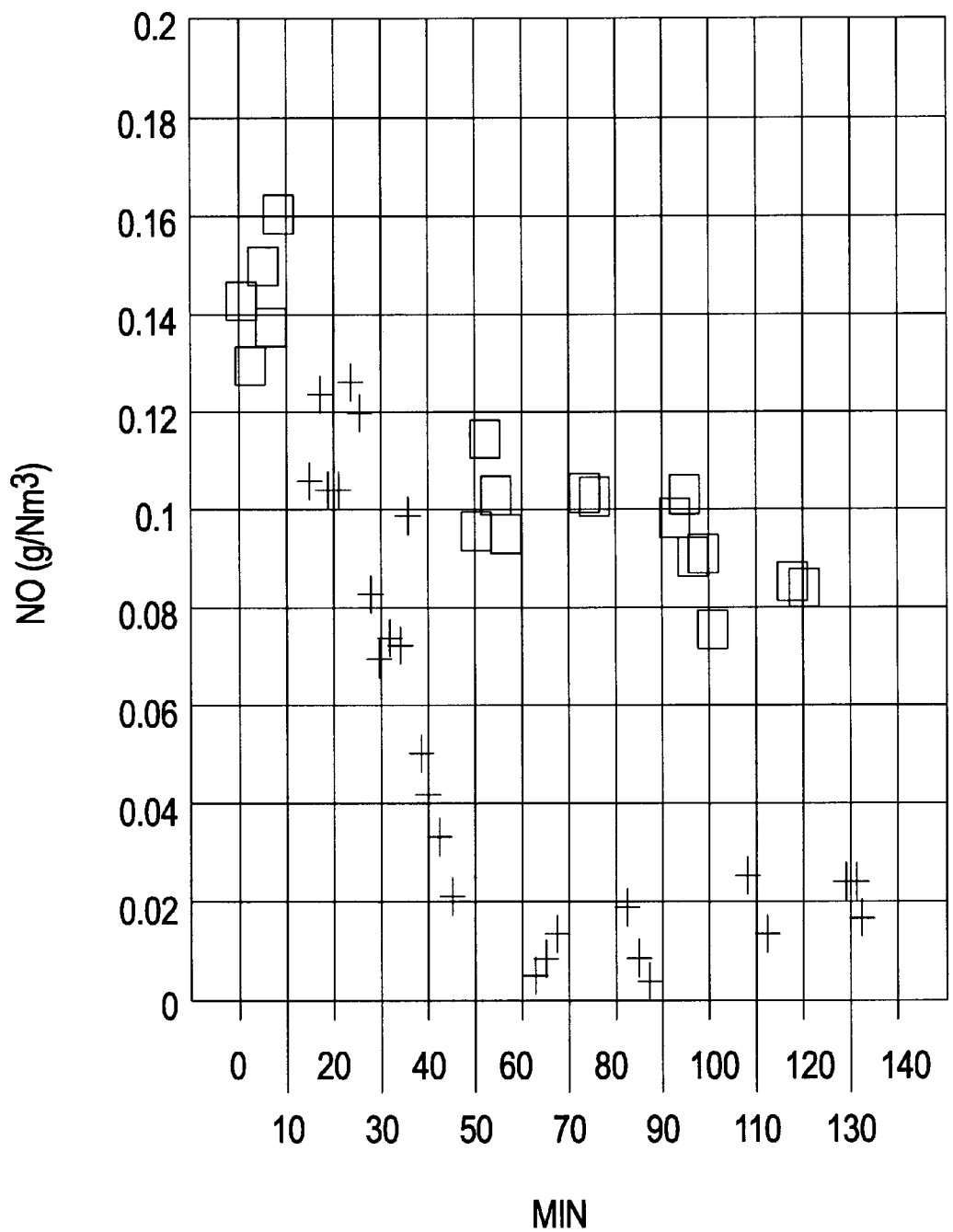
FIG. 9 shows the amount of NO removed out of smoke using a mixture of sodium percarbonate and sodium bicarbonate.
Figure 10:
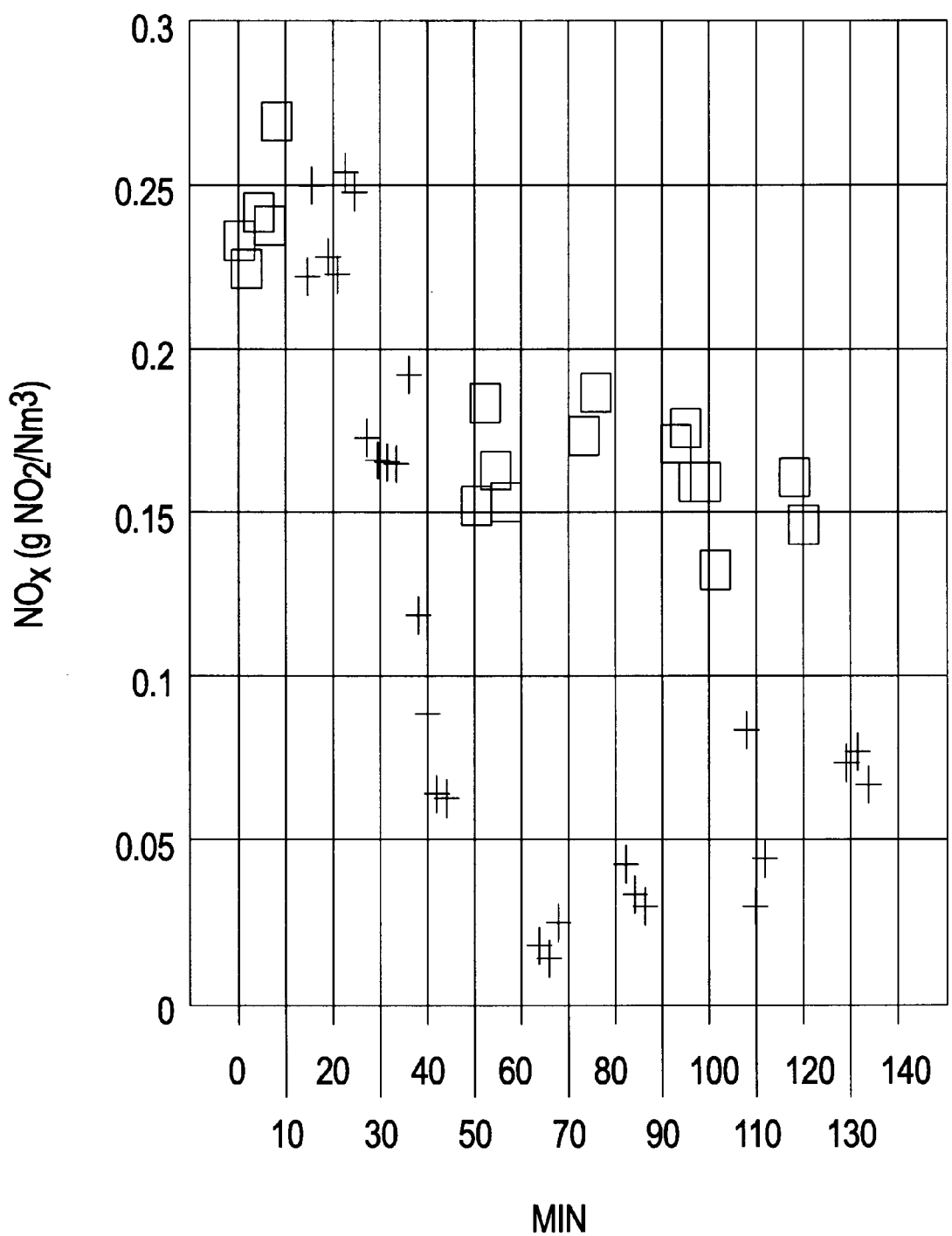
FIG. 10 shows the amount of $NO_x$ removed out of smoke using a mixture of sodium percarbonate and sodium bicarbonate.
Figure 11:
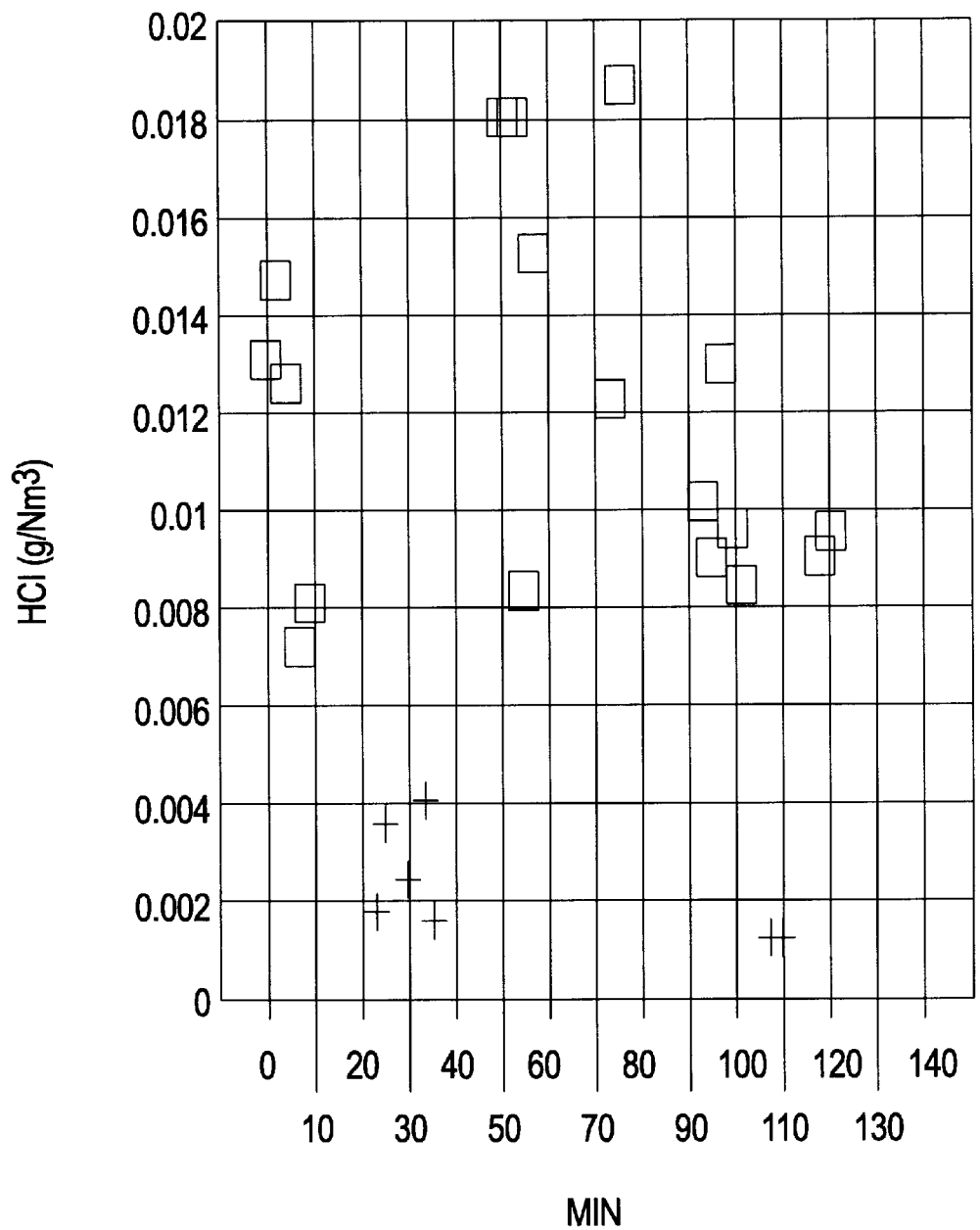
FIG. 11 shows the amount of HCl removed out of smoke using a mixture of sodium percarbonate and sodium bicarbonate.
Figure 12:
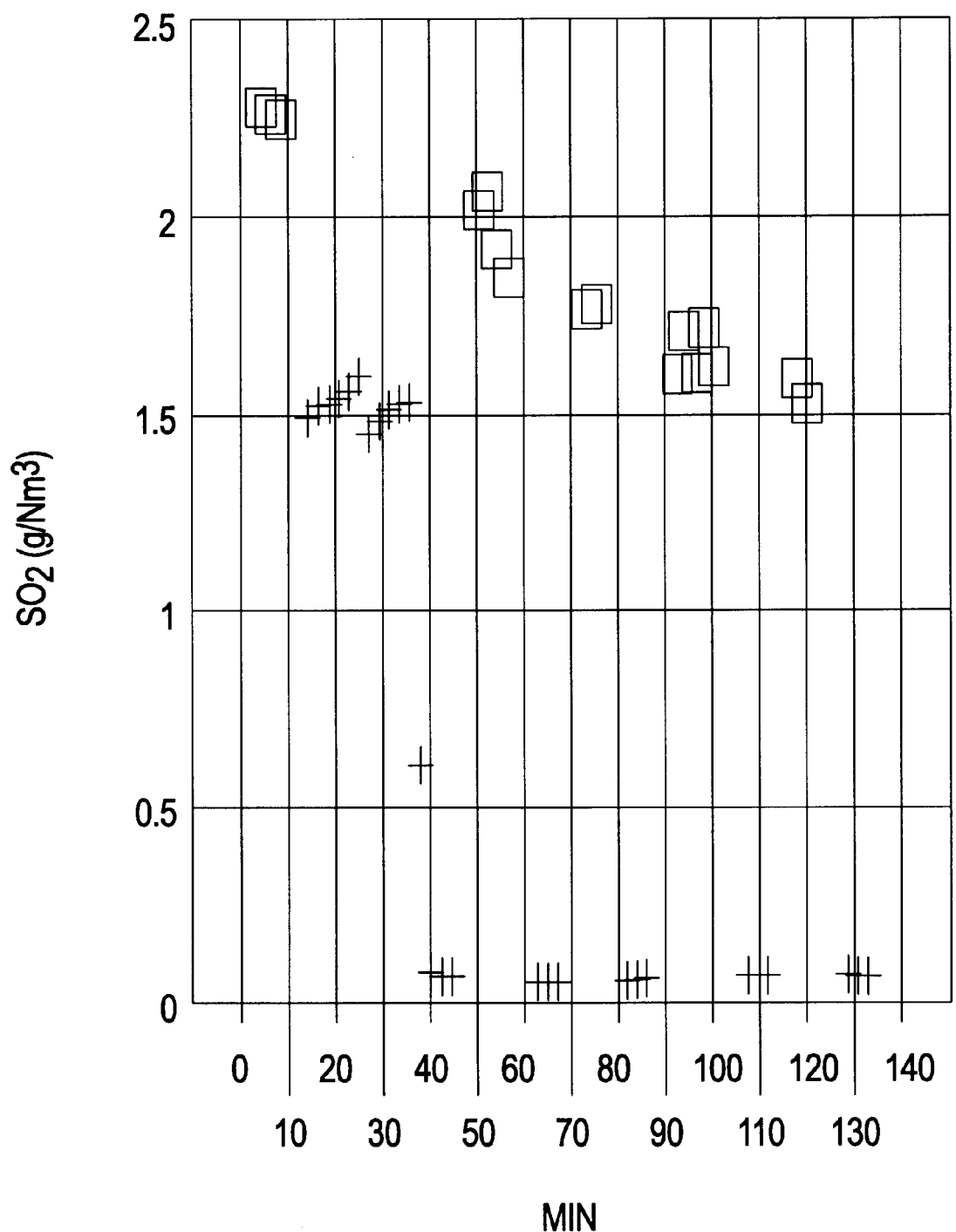
FIG. 12 shows the amount of $SO_2$ removed out of smoke using a mixture of sodium percarbonate and sodium bicarbonate.

In the examples whose description follows, effluent smoke from an industrial plant has been purified, this smoke containing nitric oxide, nitrogen oxides ($NO_x$) hydrogen chloride and sulphur dioxide, the balance being composed essentially of carbon dioxide and of water vapour. In order to purify this smoke, it was passed through a reaction chamber and a reactive powder was injected therein. The contents of hydrogen chloride (HCl) of sulphur dioxide ($SO_2$) of nitric oxide (NO) and of the sum of the nitrogen oxides ($NO_x$) in the smoke were measured at the inlet and the outlet of the reaction chamber respectively. The results of the tests (converted to the case of a dry standardized smoke containing 9% by volume of carbon dioxide) have been transferred to the diagrams of FIGS. 1 to 12. In these diagrams, the scales of the abscissae represent the time (in minutes), the scale of the ordinates of FIGS. 1, 5 and 9 represents the nitric oxide content of the smoke, expressed as $g/Sm^3$, the scale of the ordinates of FIGS. 2, 6 and 10 represents the content of the sum of the nitrogen oxides $NO_x$ in the smoke (this content being expressed as g of oxides, considered in the $NO_2$ form, per $m^3$ of gas), the scale of the ordinates of FIGS. 3, 7 and 11 represents the hydrogen chloride content of the smokes as $g/Sm^3$, and the scale of the ordinates of FIGS. 4, 8 and 12 represents the sulphur dioxide content of the smoke, as $g/Sm^3$. The □ symbols relate to the composition of the smoke at the inlet of the reaction chamber and the + symbols relate to the composition of the smoke at the outlet of the reaction chamber. As regards the reactants, a sodium percarbonate powder (active oxygen content: 135.07 g/kg), a sodium bicarbonate powder and a powder obtained by mixing the sodium percarbonate powder (15% by weight) and the sodium bicarbonate powder (85% by weight) were prepared. The powders had a mean diameter of 15 to 25 μm and a particle size gradient of 2 to 3, as defined above.

Example 1 (for reference)

In this example, the smoke was treated with 5 kg of the sodium percarbonate powder per hour. The results of the test are shown in the diagrams of FIGS. 1 to 4. It is observed that the purification of the smoke from nitric oxide (FIGS. 1) and from nitrogen oxides $NO_x$, (FIG. 2) was poor and very irregular.

Example 2 (for reference)

The test of Example 1 was repeated, 5 kg of the sodium bicarbonate powder per hour being used as reactive composition. The results of the test are shown in the diagrams of FIGS. 5 to 8. It is observed that the sodium bicarbonate had no substantial effect on the purification of the smoke from nitric oxide (FIG. 5), from nitrogen oxides $NO_x$ (FIG. 6) and from sulphur dioxide (FIG. 8).

Example 3 (in accordance with the invention)

The test of Example 1 was repeated, the reactive composition according to the invention, composed of the mixture of sodium percarbonate and of sodium bicarbonate, being used. 10 kg of the reactive composition per hour were injected into the smoke. The results of the test are shown in the diagrams of FIGS. 9 to 12. It is observed that the smoke has been very efficiently purified, not only from nitric oxide (FIG. 9) but also from the combination of the nitrogen oxides $NO_x$ (FIG. 10). Moreover, purification from hydrogen chloride (FIG. 11) and from sulphur dioxide (FIG. 12) was better than that obtained in the tests of Examples 1 and 2.

What is claimed is:

1. A process for removing nitrogen oxides out of a gas, comprising:
    introducing a mixture comprising a solid peroxide compound and at least one compound selected from the group consisting of alkali metal carbonates, alkali metal bicarbonates and solid solutions thereof into said gas, said gas being at a temperature that is greater than 350 K so that the mixture interacts with the gas to form particles, and removing the particles out of the gas.

2. The process according to claim 1, wherein the mixture is introduced into the gas when the gas is at a temperature of at least 375 K.

3. A process for removing nitrogen oxides and/or sulfur oxides and/or hydrogen chloride from a gas, comprising:

introducing a mixture comprising a solid peroxide compound and at least one compound selected from the group consisting of alkali metal carbonates, alkali metal bicarbonates and solid solutions thereof into the gas, said gas being at a temperature that is greater than 350 K so that the mixture interacts with said gas to form particles, and removing the particles out of the gas.

4. The process according to claim 3, wherein the mixture is introduced into the gas when the gas is at a temperature of at least 375 K.

* * * * *